United States Patent [19]
Ralph et al.

[11] Patent Number: 5,317,569
[45] Date of Patent: May 31, 1994

[54] ALTERNATE PATH FDDI STANDARD LAN

[75] Inventors: Stanley F. Ralph, Moorestown; Leonard Weinberg, Haddonfield; Joseph J. Hart, Mt. Holly, all of N.J.

[73] Assignee: General Electric Co., Moorestown, N.J.

[21] Appl. No.: 829,782

[22] Filed: Jan. 31, 1992

[51] Int. Cl.$^5$ .............................................. H04J 3/02
[52] U.S. Cl. .................. 370/85.9; 371/11.2; 370/85.12
[58] Field of Search .............. 370/85.9, 16.1, 16, 370/85.12, 85.14, 62; 371/11.1, 11.2, 20.6

[56] References Cited
U.S. PATENT DOCUMENTS
| | | | |
|---|---|---|---|
| 4,723,241 | 2/1988 | Grobel et al. | 371/11.2 |
| 4,914,625 | 4/1990 | Billian | 371/11.2 |
| 5,105,420 | 4/1992 | Ardon et al. | 371/11.2 |

OTHER PUBLICATIONS
SBT/IEEE International Telecommunications Symposium, Sep. 3-6, 1990.
FDDI Concentrators and How they Work Together with Other FDDI Network Components (Franzer).
Partial European Search Report, Sep. 1, 1993 (3 pages).
"Twisted-Pair FDDI clears major hurdle", Nitzsche, Digital News, Jul. 6, 1992, issue.
Tiffany et al., 'The DEC Concentrator 500 Product' Digital Technical Journal (1991) pp. 64-75.

*Primary Examiner*—Douglas W. Olms
*Assistant Examiner*—Shick Hom
*Attorney, Agent, or Firm*—W. H. Meise; C. A. Nieves; S. A. Young

[57] ABSTRACT

A local area network uses standard ANSI FDDI LAN concentrator stations and a first set of mutually reverse-direction data buses or loops, in conjunction with an additional set of mutually reverse-direction data paths. The standard FDDI protocols when applied in the context of the particular connections of the concentrator station operate in the event of a break in the data path terminating at an input or output port, to reconfigure the station to interconnect the buses in a manner which routes data around even multiple breaks in the buses, to thereby maintain communication integrity.

10 Claims, 6 Drawing Sheets

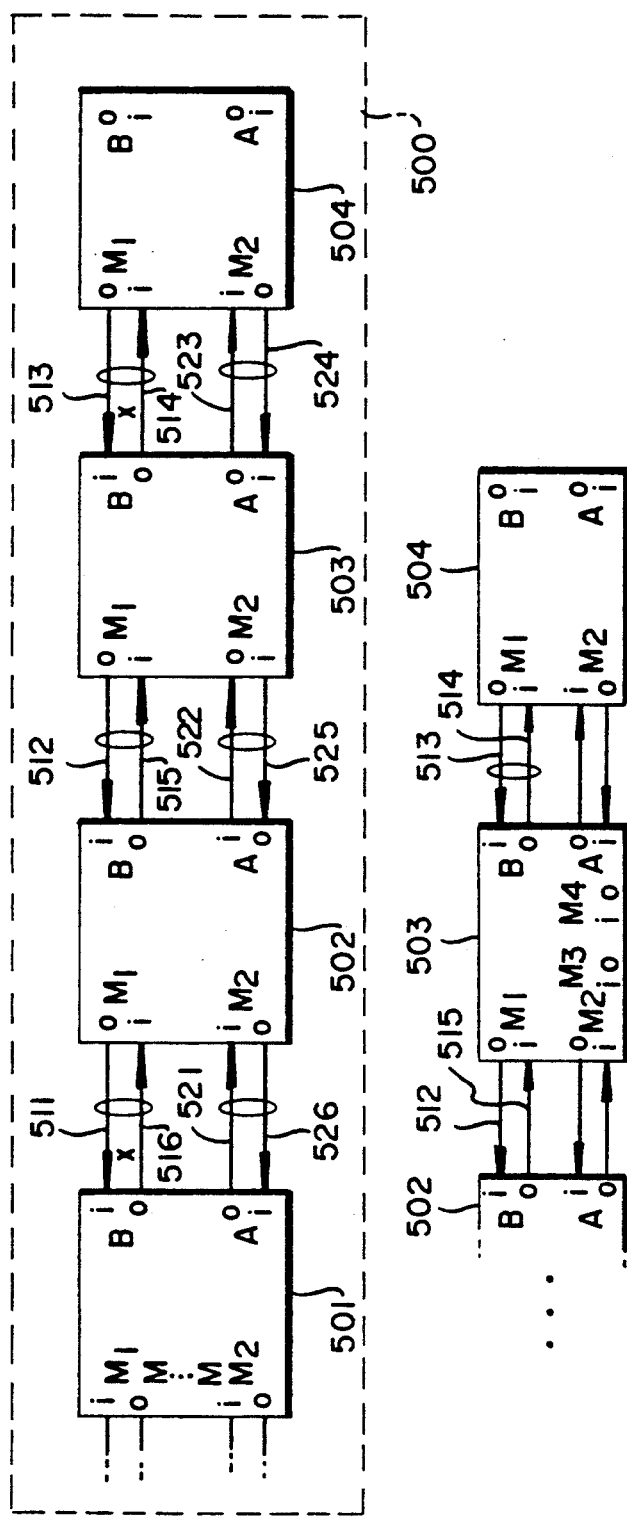

ALTERNATE PATH FDDI STANDARD LAN

The Government has rights in this invention pursuant to contract no. N00024-89-C-5146 with the Department of the Navy.

BACKGROUND OF THE INVENTION

This invention relates to local area communication networks, and more particularly to local area networks (LAN) according to ANSI Fiber Distributed Data Interface (FDDI) standards, which LAN are arranged for enhanced reliability in adverse environments.

Modern vehicles such as aircraft, ships and the like include sophisticated computer systems for sensing the environment, evaluating the sensed information, and for controlling the vehicle and/or its payload in response to the evaluations. Such vehicles, and military equipment whether fixed or mobile, require highly reliable communications among the sensors, evaluation equipment, and the controlled devices. The reliability is often provided, at least in part, by redundancy. Thus, in addition to redundant computers for performing the evaluations, and redundant sensors and controlled devices, if possible, the interconnections should also be redundant. In warships, for example, there may be a relatively large number of sensors, including a plurality of radar, sonar, infrared and other sensors, all of which must be interconnected with command centers and with evaluation computers, and with guns, missiles and their controllers.

In the past, such warships have provided redundant point-to-point communication or data transmission paths or links between each mission-critical pair of devices, with the redundant paths differently routed within the ship to avoid the possibility that single-point damage can disrupt the communication. With this arrangement, all equipments remain interconnected, and any one device or sensor only becomes isolated from the system in the event of breaks on both of its separately routed, mutually alternate paths. Thus, extensive damage to the ship is likely to break several data paths, but these data paths are not likely to include both data paths to a particular device, so all devices are likely to remain interconnected. With the advent of computerized control, each computer (including the redundant computer) is required to provide a sufficient number of input-output (IO) ports to allow connection by at least first (primary) and second (alternate) paths to each of the devices which it serves. Specialized military computers with large numbers of input-output ports are available for such interconnections. The rapid expansion of control requirements tends to quickly render obsolete any computer with a fixed number of IO ports, and specialized computers with yet larger numbers of IO ports then become necessary.

With a view toward improved reliability and reduced cost, attention has been directed toward the use of a standardized local area network (LAN) in conjunction with a plurality of microprocessors, such as are in common commercial use, for performing the same functions as the special-purpose computers together with their point-to point communication paths. Such a LAN arrangement allows the distributed microprocessors to perform multiple functions, thereby providing another level of, and increasing the redundancy of the computing portion of the system, and also allows ready expansion of the system to include sensors or controlled devices as their need is discovered. The use of a standardized or commercial-type LAN further reduces cost, without, it is hoped, sacrificing usability.

The American National Standards Institute (ANSI) has generated standards and protocols for token-passing fiber-optic LAN systems, which are known by the acronym FDDI, which stands for Fiber Distributed Data Interface. It would be desirable, if possible, to use the FDDI standards in relation to high-reliability systems such as those described above. At this time, FDDI-based systems are being introduced into shipboard applications, as described, for example, in an article entitled "All Aboard FDDI", by Adams, published at pp 13-17 of the December, 1991 issue of Military and Aerospace Electronics magazine. However, the FDDI standards provide only limited redundancy, and so cannot be used for mission-critical communications.

In FIG. 1, a standard FDDI local area network includes first, second and third standard FDDI stations or connection nodes 1, 2 and 3. Each standard station includes first input and output ports 1i and 1o, respectively, and second input and output ports 2i and 2o, respectively. Input-output port 1i, 2o is also known as an A port, and input-output port 2i, 1o is also known as a B port. As illustrated in FIG. 1, the first output ports 1o of each of the three standard stations 1, 2 and 3 are connected by fiber-optic transmission paths to the first input port 1i of the next standard station. For example, a transmission path 11 connects from output port 1o of station 1 to input port 1i of station 2. Similarly, a transmission path 12 connects from output port 1o of station 2 to input port 1i of station 3, and a transmission path 13 connects from output port 1o of station 3 to input port 1i of station 1, thereby forming a first loop, designated generally as 20, by which data can flow in the direction of arrow 24 among stations 1, 2 and 3. As also illustrated in FIG. 1, the second output ports 2o of each of the three standard stations 1, 2 and 3 are connected by fiber-optic transmission paths to the second input port 2i of the next standard station. For example, a transmission path 14 connects from output port 2o of station 1 to input port 2i of station 3. Similarly, a transmission path 15 connects from output port 2o of station 3 to input port 2i of station 2, and a transmission path 16 connects from output port 1o of station 2 to input port 2i of station 1, thereby forming a second loop designated generally as 22 by which data can flow in the direction arrow 26 among stations 1, 2 and 3. In this context, a transmission path is a path by which signal travels essentially unchanged from one location to another. A path may include cable, connectors, repeaters, switches, attenuators, and the like, the presence of which does not affect the signal.

Each station includes a Media Access Control unit which is associated with one, but not both, input-output ports, so that one of the two loops is designated as the main or primary loop.

The system as illustrated in FIG. 1 includes only three stations for simplicity of explanation, but could include a large number of such stations, connected in a similar manner. As illustrated, each station is connected to the next station by means of two fiber-optic transmission paths, as for example station 1 is connected to station 2 by transmission paths 11 and 16, in which data flows in mutually opposite directions. An envelope designated 28 represents the practical fact that the two fiber optic transmission paths 11 and 16 are often combined into a single multifiber cable. Similarly, envelopes 30 and 32 represent the combining of fibers 12 and 15 into a cable 30, and the combining of fibers 13 and 14 into cable 32. The FDDI network as so far described in conjunction with FIG. 1 is used by connecting sensors, computers (and their associated operator inputs) or controlled devices to externally accessible data paths associated with each station, such as path 58 associated with station 1, and paths 59 and 60 associated with stations 2 and 3, respectively. In operation, a token is produced at the primary output port of a station when it has transmitted all its current information, and the next station on the primary loop either seizes the token to make time available for its own transmission, or retransmits the token on the primary loop or ring to the next station when it has no data to transmit. Thus, the ability to transmit unimpeded on the common bus steps from station to station with the token. Reception is not dependent on the token, and all stations may, essentially simultaneously, receive data which is relevant to the stations.

On a vehicle such as a ship, it may be advantageous to route cable continuously from one end of the vehicle to the other end, connecting to various equipments along the way. This corresponds to that portion of FIG. 1 including stations 1, 2 and 3, and data paths included in cables 28 and 30, but without the data paths corresponding to those of cable 32 of FIG. 1. As described below, the two end stations "wrap" so that communications occur back and forth among the stations. This linear arrangement is termed a "root" topology The root topology has the advantage of reduced cabling requirement, but introduces the distinct disadvantage that a single break anywhere in the system results in undesirable isolation of portions of the system. This disadvantage could be remedied by a complete additional set of station nodes and interconnection cabling. However, this more expensive and complex than simply running the additional cable for the return link corresponding to cable 32 of FIG. 1.

Concentrators are allowed within the FDDI standard for expanded system connectivity. As described in an article entitled "Using Redundancy In FDDI Networks", by Ocheltree, published at pages 261-267 of the proceedings of the 15th Conference on Local Computer Networks, Minneapolis, Minn. Sep. 30-Oct. 3, 1990, and in an article entitled "The DECconcentrator 500 Product", by Tiffany et al., published at pp 64-75 of the Spring, 1991 issue of Digital Technical Journal, concentrators include a plurality of master ports in addition to the A and B ports. FIG. 2 illustrates a concentrator station in accordance with FDDI standards. In FIG. 2, an FDDI concentrator station 4 includes an A port with $1i$ and $1o$ ports, a B port including $2i$ and $2o$ ports, and a path 61 for connection to a local sensor or other device, just as in the standard FDDI stations of FIG. 1. In addition, concentrator station 4 of FIG. 2 includes a plurality of "master" (M) ports, which are available for connection of additional single stations $62a, 62b, 62c, \ldots 62n$. Such an arrangement might have utility, for example, in a LAN in which a multi-story building is to be interconnected. For this purpose, each floor might have a concentrator station, with the A and B ports connected with other concentrators on other floors in a loop as described in conjunction with FIG. 1, and at each floor, the M ports of the concentrator for that floor are connected by individual two-fiber cables to each separate single station For example, if concentrator 4 of FIG. 2 were on the fourth floor of such a building, port M1 would be connected to fourth-floor equipment station $62a$ by way of a cable $63a$, port M2 would be connected to fourth-floor equipment station $62b$ by way of a cable $63b$, etc. The A and B ports of the concentrator would, of course, be connected to other stations on the third and fifth floors. In the terminology of FDDI, the additional single stations 62 of FIG. 4 are part of a "tree", which in the case of single stations as in FIG. 4 cannot be expanded to further levels. If, in FIG. 2, each single station 62 were to be replaced by a concentrator station which was connected to its higher-level concentrator station (station 4 in FIG. 1) at one of its A or B ports, additional stations at a third level could be connected to the various M ports of the second-level station, to thereby create a tree with many levels. In such an arrangement, the lower-level stations all couple back to loop through concentrator 4, and are termed "singly homed". On the other hand, if the other of the A and B ports of the second-level concentrator is connected to another concentrator station which is also in the loop, each low-level station can couple to the loop through two (or possibly more) paths, and they are said to be "dual homed", all as described, for example, in the above mentioned Ocheltree article. In operation of the concentrator as illustrated in FIG. 2 when connected in a ring, as described, the token is received at the $A1i$ port as in FIG. 1, and is routed in succession to each of the active M ports and to the stations connected thereto, i.e. from port B to port M1, then down through all the stations in the M1 path, then to M2, and through all the stations in the M2 string,... When the token has progressed through all the stations associated with all the M ports of the concentrator, it is made available at the $B1o$ output port on the ring. Thus, the use of concentrators in a loop gives rise to delays which do not occur in standard stations, and their use is contraindicated unless necessary It should be noted that the paths between M ports of a concentrator station and the next following station are under continuing self-test during those intervals in which it is not being used for data.

FIG. 3a illustrates one possible configuration of bus connections within a standard or concentrator station, taken as standard station 1 for definiteness. In FIG. 3a, first and second directional couplers 40 and 42, respectively, have their main through lines coupled to each other and to input port $1i$ and output port $1o$. The branch lines 44 and 46 of directional couplers 40 and 42, respectively, are coupled to active circuits illustrated as a block 56, which may include light detectors and modulators. Similarly, third and fourth directional couplers 50 and 48 have their through paths coupled to each other and to input and output ports $2i$ and $2o$, respectively, and their coupled branch lines coupled to active circuit block 56. Suitable directional couplers include the well-known star couplers. Those skilled in the art know that this arrangement couples signals directly from input port $1i$ to output port $1o$, and from input port $2i$ directly to output port $2o$, and also couples the active circuit portion 56 to receive signals from the input ports $1i$ and $2i$ of standard station 1, and to couple signals therefrom to output ports $1o$ and $2o$ of station 1, but has the disadvantage of splitting the transmission power and thereby reducing the signal-to-noise ratio. In many applications, this will be of no consequence, but when large numbers of stations are to be interconnected, the cumulative loss of the couplers may exceed the regenerative power of the various stations.

Lower through loss at each station is permitted by the use of a switched "Trunk Coupling Unit" (TCU), illustrated in FIG. 3b. In FIG. 3b, station 1 receives signal through input port 1i, which is applied to a moving-mirror fiber-optic switch 98. Switch 98 allows signal to be routed directly from input port 1i to output port 1o when that station or node is shut down or deprived of power, which is a fail-safe bypass mode of operation. In normal operation, when the station is powered up, switch 98 couples signal from input port 1i to the active portions 56 of the node, and from the active portion to output port 1o. The operation of the TCU associated with ports 2i and 2o is similar.

The FDDI standard provides for error recognition, and for reconfiguring the station in response to errors for improving reliability. FIG. 4a is similar to FIG. 1, but includes an assumed break in a transmission line. While standard stations are described, the following discussion is equally applicable to concentrator stations. As mentioned, the transmission lines are actually coupled into cables including at least two paths, as for example cable 28 includes the two transmission paths 11 and 16 extending between stations 1 and 2. As a result, a break in one cable almost invariably breaks both optical fibers therein. The FDDI standard takes cognizance of this likelihood, and arranges its error detection circuits within each station to recognize the existence of faults, which include (a) a fault in the transmission path terminating at a 1i input port, and (b) a fault in the transmission path which starts at a 1o output port. The (a) type of fault may be termed an "upstream" fault, and the (b) fault may be termed "downstream", relative to the "main" data path or loop. In FIG. 4, a large "X" is placed over multifiber cable 28, thereby indicating that it is broken, possibly as a result of environmental or hostile action. As to station 1, the break is a downstream "b" fault, and as to station 2, it is an "a" type upstream fault. The FDDI standard requires the station subject to an upstream fault (in this example, station 2) to disconnect its 2i input from its 2o output and reconnect or "wrap" it to its 1o output, as illustrated by dashed path 70 in station 2. The disconnection of input port 2i from output port 2o is of no consequence, because any data applied to output port 2o cannot traverse data path 16 of cable 28 anyway. The FDDI standard also prescribes that a station subject to a downstream fault (station 1 in the example) must disconnect its 1i input port from the 1o output port, and reconnect or wrap it to the 2o output port, as illustrated by dash line 72 in station 1. As in the case of station 2, disconnecting input port 1i from output port 1o makes no difference, as data applied to data path 11 of cable 28 cannot traverse the break. The FDDI wrap protocol results in formation of a third loop to replace the broken first loop 20 and second loop 22. The third loop extends from output port 1o of station 2, through path 12, ports 1i and 1o of station 3 to path 13, then through input port 1i, path 72, and output port 2o of station 1, through path 14 to input port 2i of station 3, and out of output port 2o of station 3, through data path 15 to input port 2i of station 2, and finally through path 70 back to output port 1o of station 2. Thus, a single break has no significant effect on the communications among stations 1, 2 and 3 (although the delay may increase somewhat).

FIG. 4b is similar to FIG. 4a, differing only in that a second break in the cabling is shown, illustrated by a large "X" over cable 30. This break obviously isolates station 2 from stations 1 and 3. Station 1 still experiences a downstream fault, and responds by producing internal reconfiguration path 72. Station 3 experiences an upstream fault, and responds by reconfiguring itself by wrapping its 2i input port to its 1o output port, just as station 2 did in FIG. 4a. The wrap path in station 3 is designated 74. The wrappings provided by reconfiguration paths 72 and 74 of stations 1 and 3, respectively, form yet another loop which includes stations 1 and 3, and paths 13 and 14. In addition to the isolation of station 2 from stations 1 and 3 by the breaks of cables 28 and 30, station 2 is further isolated by the operation of the wrap specified by the FDDI protocol, which requires disconnection of paths 11 and 15 from station 2. As mentioned, the illustrated system includes only three stations, for simplicity of explanation. It should be understood that station 2 of FIG. 4b may actually represent a plurality of stations, and that the wrap specification will result in those additional stations forming their own interconnected loop, which, however, is totally isolated (by the multiple breaks) from the loop including stations 1 and 3. For mission-critical data communications, isolation of whole sections by damage to two unrelated data paths may not be acceptable. It should be noted that the looping data paths in an FDDI system are often illustrated side-by-side, as is shown by the alternate placement of data path 14 in the form of a dot-dash line 14b adjacent to data path 13 in FIG. 4b. This configuration results in the use of the terminology of formation of a "U" or "horseshoe" path instead of an alternative "loop" path when a wrap occurs. Thus, reconfiguration forms a horseshoe or a loop, depending upon the form or topology of the circuit which one has in mind, but the horseshoe and the loop are equivalent terms in this context.

Thus, while it would be desirable to use the FDDI system for all shipboard communications, including mission-critical data, the possibility of total isolation of portions of the communications system due to multiple breaks in the transmission cable makes it unusable for mission-critical applications. It might be possible to use an FDDI system for auxiliary communications, while using point-to-point communications for mission-critical applications, but this would not help the key problems of expandability of an existing system, cost, and the need for special-purpose computers. If the FDDI system standards are modified to achieve the reliability goal, the cost benefits of commonality with commercial systems are lost.

A SAFENET study group established by the Navy has conducted a review of LAN for mission-critical applications, and is in the process of generating SAFENET I standards based on IEEE 802.5 "free-token" protocol, which standard specifies that the two fiber transmission lines be separately routed, and adopts "ring hop", which amounts to abandoning a defective loop or ring and using the operational loop. The free-token protocol is not considered advantageous, because the hold time at any station is not controlled, and thus priority messages may be delayed excessively. The SAFENET group has also at least partially generated SAFENET II LAN standards. The SAFENET II standards define a timed token ring pursuant to FDDI standards, but in which the dual counter-rotating rings are separately routed. It supports a single failure, but degrades in the presence of additional failures, and therefore is no better than FDDI.

An improved communication system is desired.

SUMMARY OF THE INVENTION

A LAN according to the invention uses FDDI standards, but interconnects the FDDI standard concentrator stations elements in a manner which, together with intraconnection protocols associated with each concentrator station which are in conformance with the FDDI standards, provide redundancy and reliability tending to equal that of the point-to-point system. This is accomplished, in short, by using, primary (or first) and alternate (or second) loops or data buses, each including first and second transmission paths operating in mutually opposite directions, with concentrator stations instead of FDDI standard stations. Each concentrator station includes arrangements which sense a break in that portion of the primary loop terminating at the station, and which, in that station, couples input and output ports originally coupled to the broken cable to an alternate cable segment.

DESCRIPTION OF THE DRAWING

FIG. 5 is a simplified block diagram of a LAN according to the invention;

FIG. 6 is a simplified, partial block diagram of another configuration of a communication system in accordance with the invention, in which branched loops occur;

DESCRIPTION OF THE INVENTION

Figure 1:
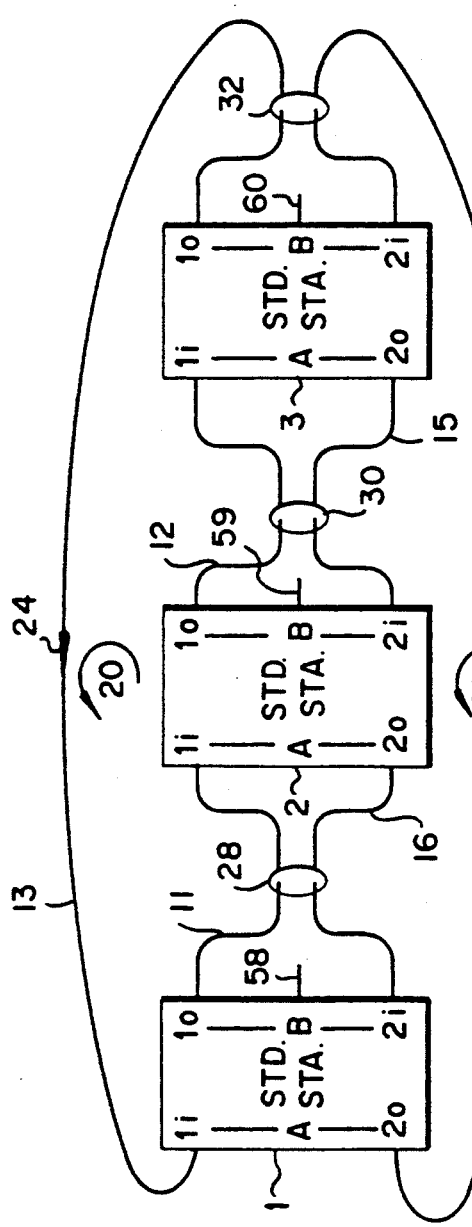
FIG. 1 is a simplified block diagram of a basic prior art FDDI system using FDDI standard stations interconnected in loop form.
Figure 2:
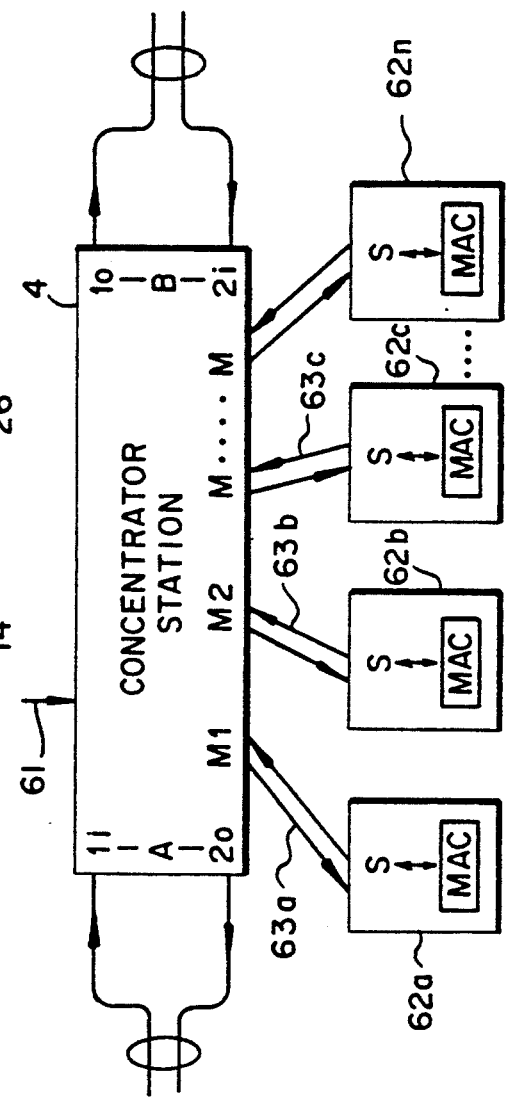
FIG. 2 is a simplified block diagram of a concentrator station according to the FDDI standard which can be used instead of a standard station in the loop of FIG. 1 for appending a plurality of additional uses at a particular location in a tree fashion.
Figure 3A:
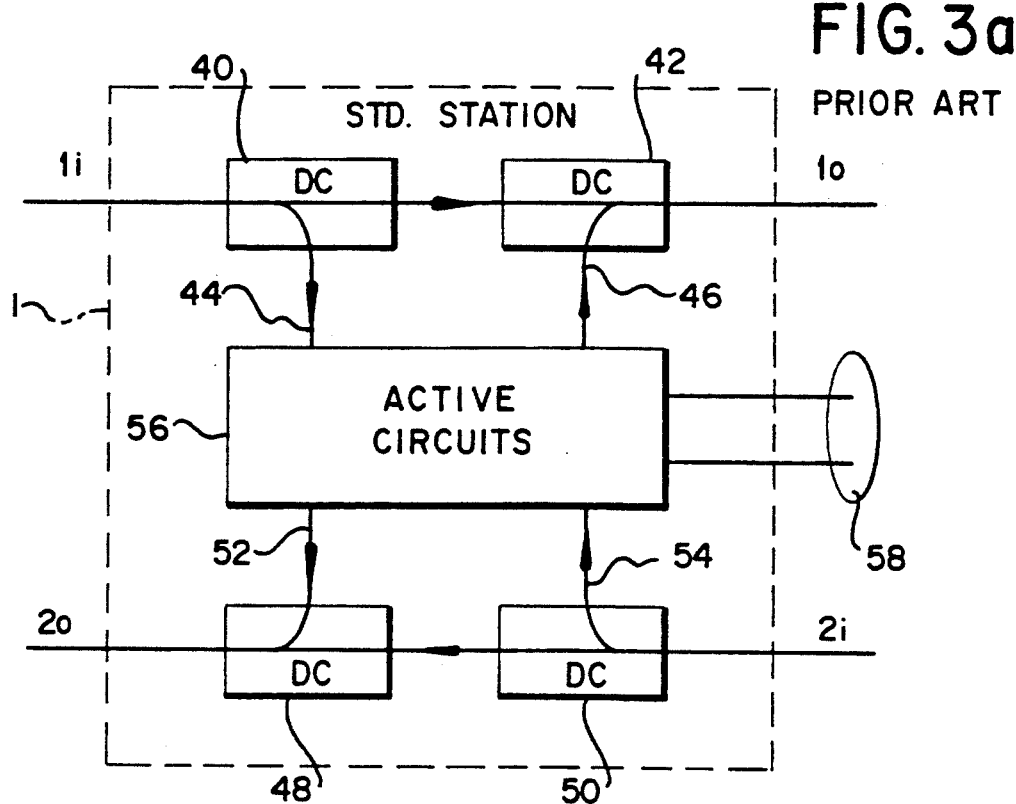
FIGS. 3a and 3b are simplified block diagrams of prior-art arrangements by which a standard or concentrator station may be coupled to a transmission line.
Figure 3B:
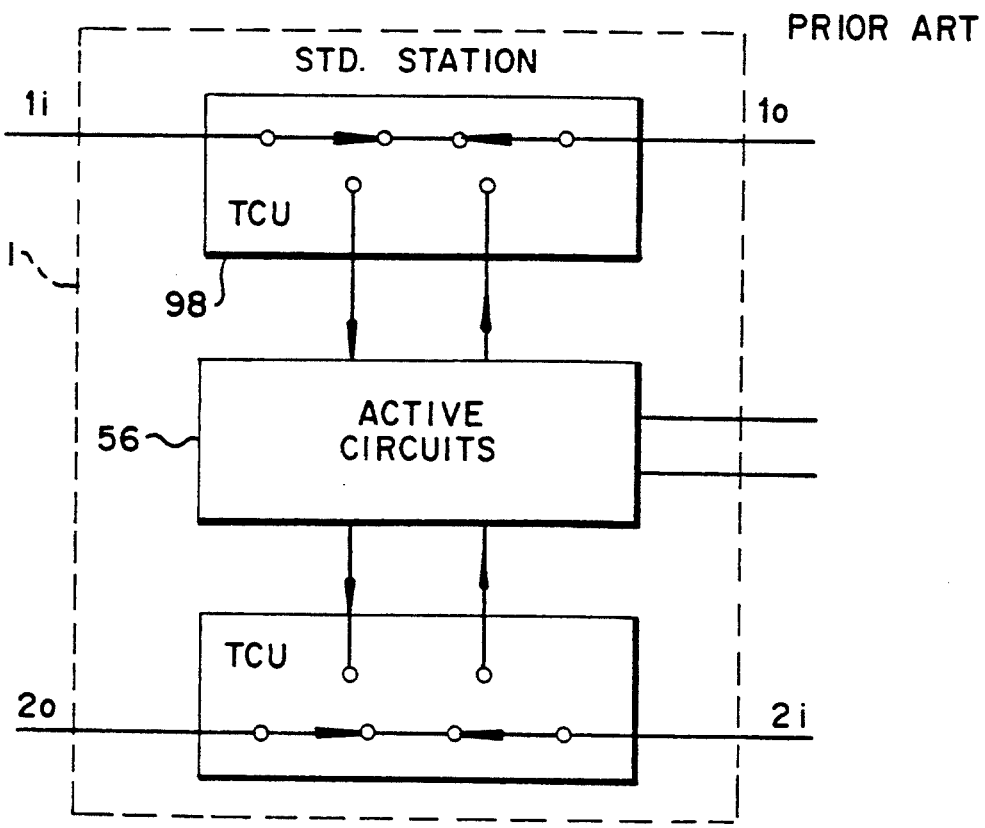
Figure 4A:
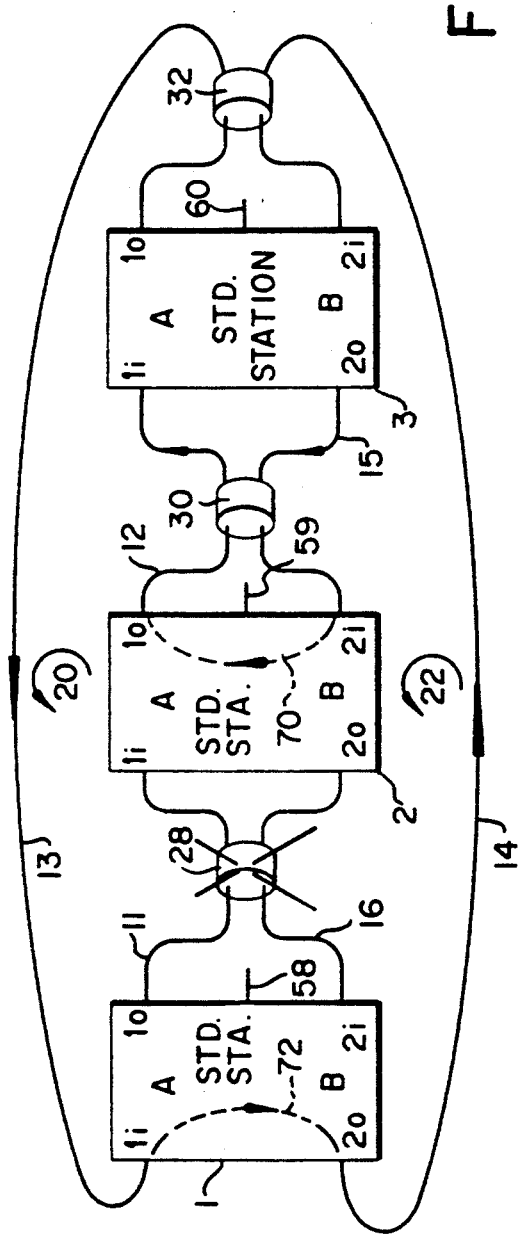
FIG. 4a is a simplified block diagram of the system of FIG. 1, illustrating a single break in the loop, and the FDDI standard data path rerouting for reliability.
Figure 4B:
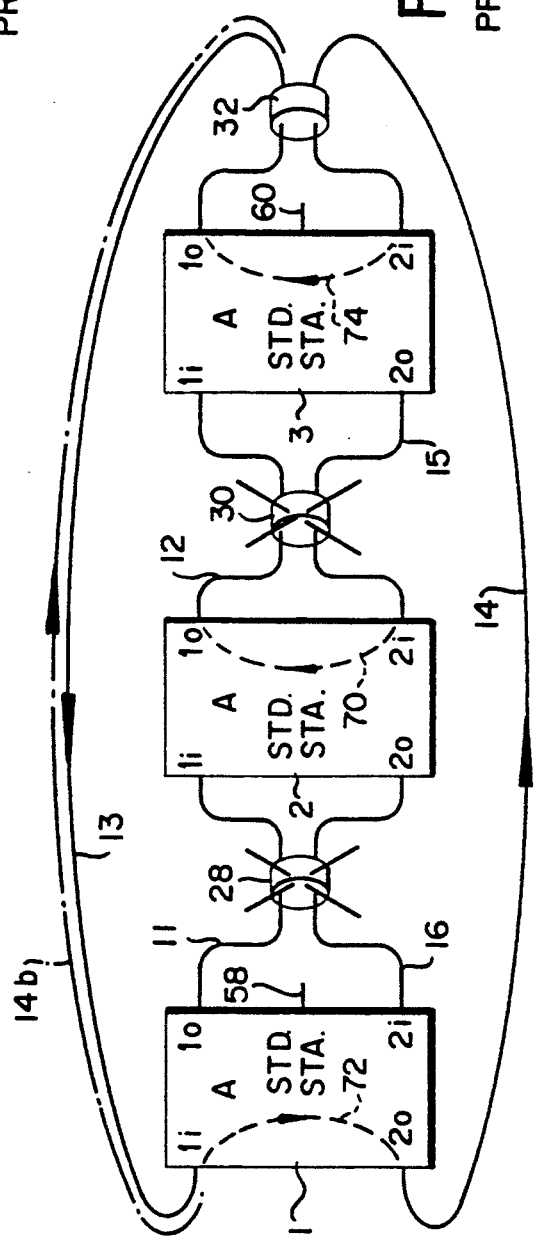
FIG. 4b is similar to FIG. 4a, but illustrates the effect of plural breaks, all according to the prior art.

In FIG. 5, a communication system 500 includes a plurality of concentrator stations 501, 502, 503, and 504, which are coupled with a loop. Unlike the arrangements of FIGS. 1 and 2, the A and B ports of adjacent stations are not directly connected together, but instead each A or B port is connected to an M port of the adjacent station. More particularly, the M1 output (o) port of station 504 is connected by a path 513 to the B input (i) port of station 503. The M1 o port of station 503 is connected by path 512 to the B i port of station 502, and the M1 o port of station 502 is connected by path 511 to the B i port of station 501. As mentioned, the use of concentrator stations may result in a net increase in token transit time by comparison with standard stations, but the increased transit time is considered minor by comparison with the advantages of the system, as described below.

As suggested by the additional letters "M" associated with station 501, additional M ports may be available in each concentrator station, and those additional M ports may be used to access additional tree-connected stations, if desired.

The various data paths of FIG. 5 are grouped into cables, as suggested by the encompassing circles. Each cable is referred to by the same number as that of the lower-numbered one of the associated data path which it contains.

In operation of the system of FIG. 5, a primary loop is designated by a media access control unit in the stations, and includes FDDI standard B and M ports (the M ports are designated with numerals for convenience). As mentioned above, when a concentrator station includes active M ports, the token passes from the B port to the first active M port, which in this case is the M1 port. In the context of the connections illustrated in FIG. 5, the progression from a B port to an M1 port results in a further connection to a B port, which corresponds to progress around the primary loop. End stations 501 and 504 wrap according to the FDDI standard, with station 501 wrapping the B i port to the B o port. Also, station 504 wraps the M1 i port to the M1 o port. This wrapping forms the closed primary loop. The closed loop so formed in the root topology by the wrapping includes paths 511, 512, 513, 514, 515, and 516. The other paths, in accordance with FDDI concentrator specifications, are in continuous self-testing of the individual inter-station data paths. For example, while the above mentioned primary path is available, the stations test data paths 521 and 526, which may be conceived of as a small loop, and also test data path pairs 522, 515; and 523, 524. Thus, alternate cables 521, 522 and 523, while they are connected in the same manner as the cables 511, 512, and 513, may be considered not to form a loop, because the individual segments are undergoing individual testing when not being used for carrying data.

In accordance with FDDI standards, each station switches from a particular failed segment of the primary loop to the associated alternate segment. For example, if an "upstream" break occurs in cable 511 of FIG. 5, as suggested by the letter x, or in either of the data paths 511 or 516 contained therein, which are part of the primary loop, station 501 routes data, which it would otherwise have applied to its B o port, to its A o port instead, so that the data can proceed over data path 521 to the M2 i port of station 502. Station 502, according to FDDI standards, would ordinarily route data entering its B port to the first active M port, which is M1. In the presence of a "downstream" fault relative to port M1, station 502, pursuant to the FDDI standard, routes data incoming to its B i port to its M2 o port instead of to the M1 port, so that it may be transmitted over data path 526 to station 501. Station 502, also in accordance with FDDI standards, routes data incoming to its M2 i port to its B o port. Thus, a break on cable 511, downstream from station 502, results in that station rerouting its B inputs and outputs to its M2 inputs and outputs, thereby maintaining communication with station 501 by way of unbroken cable 521. In effect, the FDDI reconfiguration, when used in a system structured as described, switches data from a segment of the primary loop to an alternate segment.

More generally, if the primary one of the two cables interconnecting one station with its adjacent station breaks, the system as described switches the data flow to the corresponding alternate segment. For example, if an additional break occurs in the system of FIG. 5, as for example at the "x" in cable 513, the system switches over to alternate cable 523. It should be noted that a break in an alternate path while the primary path is operational will not cause any alteration in system operation, it merely results in loss of an alternative for the particular primary path for which it is the alternate.

As so far described, the loop arrangement 500 of FIG. 5, according to the invention, includes a station 501 which includes M1 and M2 ports, which can be connected to the A and B ports of additional concentrator stations to extend the loop. In addition, each concentrator station can include additional M port pairs, which might be designated M3 and M4, for example, another kind of connection can be made. FIG. 6 illustrates a portion of the arrangement of FIG. 5, including stations 502, 503, and 504, and also illustrating additional M ports M3 and M4. As illustrated in FIG. 6, the M3 port of station 503 is connected to the B port of an additional concentrator station 506, and the M4 port of station 503 is connected to the A port of station 506. These connections start another loop portion which is effectively connected in series with the loop as described in conjunction with FIG. 5. A token originating at station 504 of FIG. 6 enters the B port of station 503, and enters the active or primary one of the M3, M4 port pair of station 506, which in normal operation will be the B port. The token will proceed to the M1 output port of station 506, and through any stations downstream therefrom, finally returning to station 503, and becoming available for transmission to station 502 and stations, such as 501, which are downstream therefrom.

Figure 7:
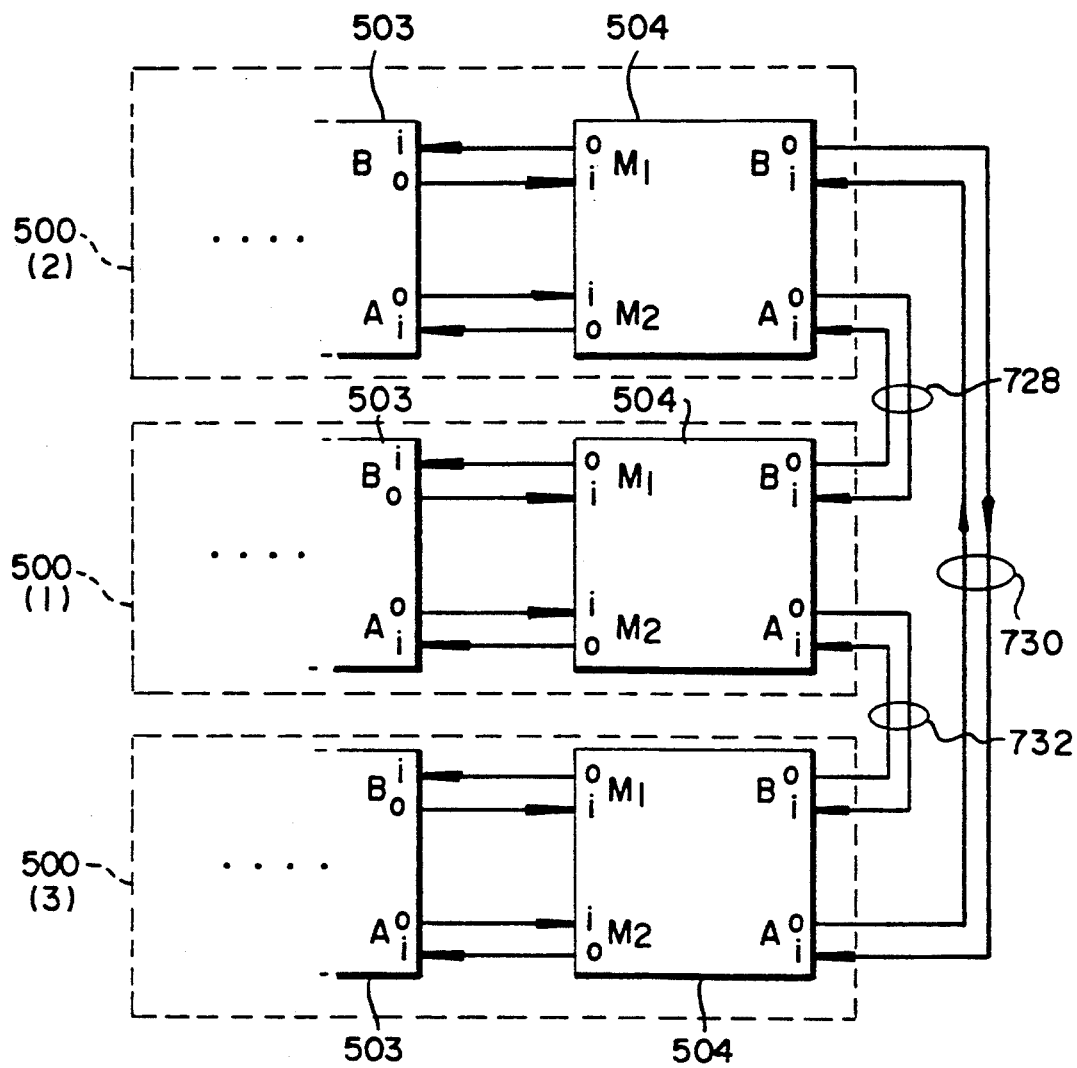
FIG. 7 illustrates another arrangement according to the invention, in which plural communication systems such as that of FIG. 5 are arrayed in a pitchfork structure.

Referring once again to FIG. 5, it will be noted that the right-most concentrator 504 includes unused A and B ports. In that respect, communication system 500 of FIG. 5 is similar to an unused standard FDDI station, such as any one of the stations of FIG. 1 by itself. Consequently, a plurality of the communications systems 500 of FIG. 5 can be interconnected in the manner illustrated in FIG. 1. More particularly, a plurality of systems 500 can be arrayed in a "pitchfork" configuration, such as that illustrated in FIG. 7. In FIG. 7, elements corresponding to those of FIG. 5 are designated by like reference numerals In FIG. 7, the bottom-most system 500 corresponds in principle to station 3 of FIG. 1, and it therefore carries the additional parenthetical designation (3). The B port of system (3) of FIG. 7 is connected by a two-conductor or two-path cable designated 832 (corresponding to cable 32 of FIG. 1) to the A port of the right-most station 504 of system 500 (1), which corresponds in principle to station 1 of FIG. 1. The B port of station 504 of system 500 (1) is connected over a cable 728, corresponding to cable 28 of FIG. 1, to the A port of station 504 of system 500 (2) of FIG. 7. Lastly, the B port of station 504 of system 500 (2) of FIG. 7 is connected by a cable 730, corresponding to cable 30 of FIG. 1, to the A port of station 504 of system 500 (3) of FIG. 7. Thus, the concentrator structure according to the invention can be connected into supraloops pursuant to the FDDI standard. Unfortunately, the supraloops formed in this fashion do not enjoy the same survivability in the presence of multiple breaks as that of the systems according to the invention.

Figure 8:
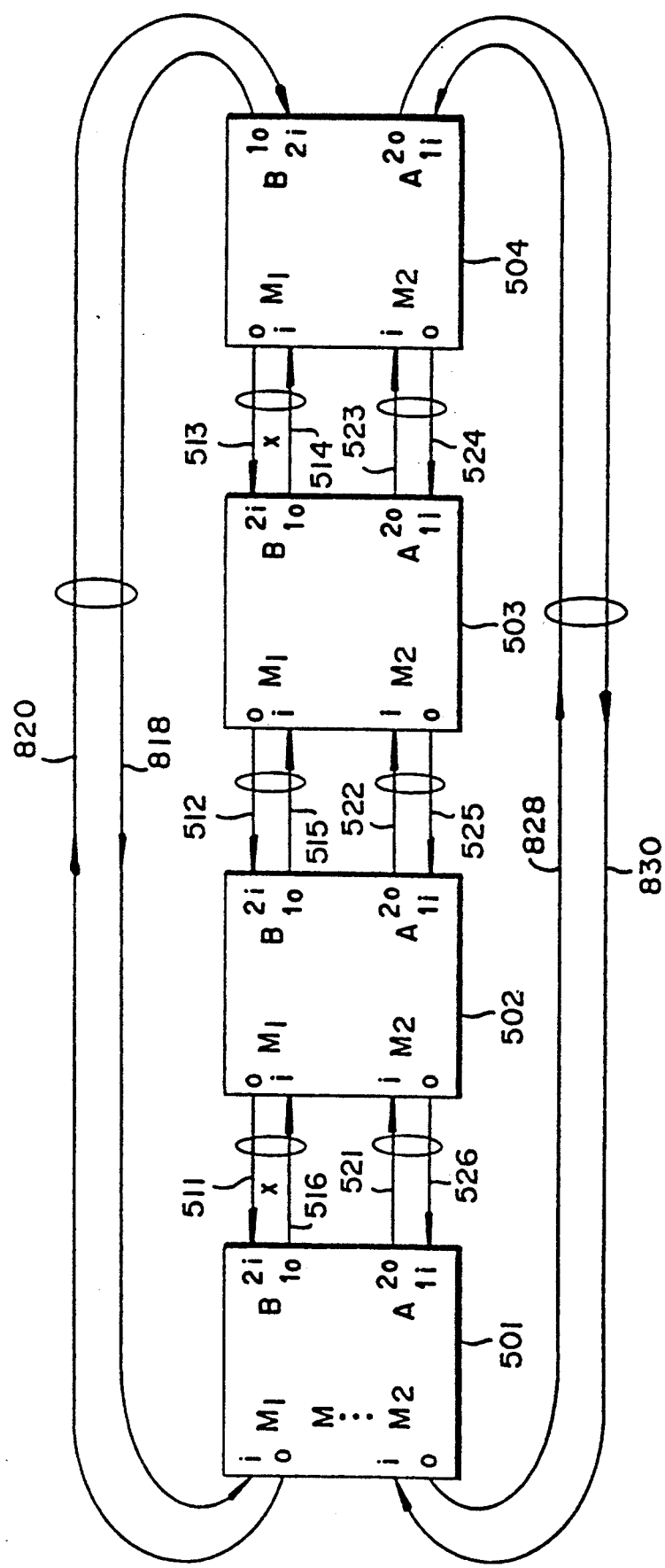
FIG. 8 illustrates another arrangement similar to that of FIG. 5, but including further loop closures.

FIG. 8 is similar to FIG. 5, and corresponding elements are similarly numbered. FIG. 8 differs from FIG. 5 in that additional cables 818, 828 (defining the cable by the lowest transmission path or fiber designator) are connected from the M1 port of station 501 to the B port of station 504, and from the M2 port of station 501 to the A port of station 504. These cables, together with the other structure of FIG. 8, forms loops. For example, starting at path 820, the data or token enters the B i port of station 504, and proceeds to its M1 o port, and through path 513 to the B i port of station 503. The data proceeds through station 503 to its M1 o port, through path 512 to the B i port of station 502 and thence to its M1 o port. From the M1 o port of station 502, the data proceeds through data path 511 and the B i port of station 501, and through the M1 o port of station 501 and back onto path 820. It is believed that this configuration may fail to recognize the fact that the M1 port of station 501 is connected to the B port of station 504, and that under normal conditions of unbroken paths, that the station will not use the additional path provided by cable 818. When a break occurs in one of cables 511, 512 or 513, however, it is believed that the system may then recognize the presence of cable 818, and retain a fully operational primary path, without recourse to the alternate paths. This would advantageously provide another level of redundancy or reconfiguration. Similar comments apply to the presence of additional cable 828 of FIG. 8 in the alternate paths.

Other embodiments of the invention will be apparent to those skilled in the art. For example, while fiber-optic digital data paths are contemplated, the invention may be used with any form of transmission path, such as coaxial cable or telephone wire. Also, while digital data is described, that data may originate from a voice, video or other analog source, and may even be transmitted in analog form. As mentioned, the LAN according to the invention may be used in vehicles for adverse environments, as for example commercial and military aircraft and spacecraft, ships and submarines, land vehicles such as trains and buses, military land vehicles such as tanks and APCs, and in fixed stations where operability in the presence of damage is important, as in power stations, nuclear plants, radar and other defense systems, airport and air traffic control systems, and the like, and also other systems where outages are important, such as medical and financial systems.

What is claimed is:

1. A local area communications system, comprising:
   first and second concentrators pursuant to ANSI FDDI standards, said first concentrator including at least first and second M input-output ports and also including A and B input-output ports, and said second concentrator including A and B input-output ports, and also including further first and second FDDI-standard M input-output ports;
   a first transmission path pair connected to said first M port of said first concentrator and to said B port of said second concentrator;
   a second transmission path pair connected to said second M port of said first concentrator and to said A port of said second concentrator; and
   a third transmission path pair coupled to said first M port of said second concentrator and to said B port of said first concentrator.

2. A system according to claim 1 wherein at least one of said first and second transmission path pairs is contained within one cable.

3. A system according to claim 1 wherein said first transmission path pair is contained within a first cable and said second transmission path pair is contained within a second cable.

4. A system according to claim 1, further comprising:
a fourth transmission path pair coupled to said second M port of said second concentrator and to said A port of said first concentrator.

5. A communication system, comprising:
first, second, and last communication nodes in accordance with FDDI standards, each of said nodes including first and second main input ports and first and second main output ports, each of said nodes further including first and second auxiliary input ports and first and second auxiliary output ports, each of said nodes including access control means for, in normal operation, coupling data from said first main input port to said second main output port, and for, in normal operation, coupling data from said first auxiliary input port to said second auxiliary output port, and for, in normal operation, coupling data from said second auxiliary input port to said first main output port, and for, in the presence of an upstream fault which is upstream from said second auxiliary input port, coupling data from said first auxiliary input port to said first main output port, and for, in the presence of an upstream fault which is upstream from said first auxiliary input port, coupling data from said second auxiliary input port to said first main output port, and for, in the presence of a downstream fault which is downstream from said first main output port, coupling data from said second auxiliary input port to said second main output port;
a first data path interconnecting said second main output port of said first node to said second auxiliary input port of said second node;
a second data path interconnecting said second main output port of said second node to said second auxiliary input port of said last node;
a third data path interconnecting said first main input port of said first node with said second auxiliary output port of said second node;
a fourth data path interconnecting said first main input port of said second node with said second auxiliary output port of said last node;
a fifth data path interconnecting said second main input port of said first node to said first auxiliary output port of said second node;
a sixth data path interconnecting said second main input port of said second node to said first auxiliary output port of said last node;
a seventh data path interconnecting said first main output port of said first node with said first auxiliary input port of said second node; and
an eighth data path interconnecting said first main output port of said second node with said first auxiliary input port of said last node.

6. A system according to claim 5, wherein further ones of said nodes are interconnected in (a) said sixth and eighth data paths, and (b) said second and fourth data paths.

7. A system according to claim 5, wherein said first and third data paths are bundled in a single cable.

8. A system according to claim 5, further comprising:
a ninth data path interconnecting said first main output port of said last node with said first auxiliary input port of said first node; and
a tenth data path interconnecting said first auxiliary output port of said first node with said second main input port of said last node.

9. A system according to claim 7, wherein said fifth and seventh data paths are bundled into a single cable.

10. A system according to claim 8, further comprising:
an eleventh data path interconnecting said second auxiliary output port of said first node with said first main input port of said last node; and
a twelfth data path interconnecting said second main output port of said last node with said second auxiliary input port of said first node.